(12) United States Patent
Wild (10) Patent No.: US 10,135,583 B2
(45) Date of Patent: Nov. 20, 2018

(54) APPARATUSES, METHODS AND COMPUTER PROGRAMS FOR A BASE STATION TRANSCEIVER AND A MOBILE TRANSCEIVER

(71) Applicant: Alcatel Lucent, Boulogne Billancourt (FR)

(72) Inventor: Thorsten Wild, Stuttgart (DE)

(73) Assignee: Alcatel Lucent, Boulogne Billancourt (FR)

( * ) Notice: Subject to any disclaimer, the term of this patent is extended or adjusted under 35 U.S.C. 154(b) by 0 days.

(21) Appl. No.: 15/111,968

(22) PCT Filed: Dec. 5, 2014

(86) PCT No.: PCT/EP2014/076727
§ 371 (c)(1),
(2) Date: Jul. 15, 2016

(87) PCT Pub. No.: WO2015/110211
PCT Pub. Date: Jul. 30, 2015

(65) Prior Publication Data
US 2016/0359596 A1    Dec. 8, 2016

(30) Foreign Application Priority Data
Jan. 21, 2014   (EP) .................................... 14305083

(51) Int. Cl.
*H04L 5/00* (2006.01)
*H04B 7/06* (2006.01)
(Continued)

(52) U.S. Cl.
CPC ......... *H04L 5/0023* (2013.01); *H04B 7/0695* (2013.01); *H04B 7/088* (2013.01); *H04W 72/085* (2013.01)

(58) Field of Classification Search
CPC .... H04B 7/0695; H04B 7/088; H04B 7/0408; H04L 5/0023; H04L 5/0007; H04W 72/08
See application file for complete search history.

(56) References Cited

U.S. PATENT DOCUMENTS

2004/0214606 A1* 10/2004 Wichman ............. H04B 7/0408
                                                            455/562.1
2007/0161407 A1   7/2007 Hovers et al.
(Continued)

FOREIGN PATENT DOCUMENTS

| EP | 2 334 112 A1 | 6/2011 |
| JP | 2009-159214 | 7/2009 |
| WO | WO 2006/113188 A2 | 10/2006 |

OTHER PUBLICATIONS

International Search Report for PCT/EP2014/076727 dated Feb. 5, 2015.

*Primary Examiner* — Frantz Bataille
(74) *Attorney, Agent, or Firm* — Fay Sharpe LLP (57) ABSTRACT

Embodiments provide apparatuses, methods and a computer programs for a base station transceiver and a mobile transceiver. An apparatus (10) operable in a base station transceiver (100) of a mobile communication system comprises a transceiver module (12), which comprises interfaces to a plurality (18) of antennas, and which is operable to transmit radio signals using combinations of time and frequency radio resources. The transceiver module (12) is further operable to form a first set of beam patterns (16) using the plurality of antennas. The first set of beam patterns (16) comprises two or more spatially differing beam patterns. The base station transceiver apparatus (10) comprises a control module (14), which is operable to control the transceiver module and to transmit a common control signal for a plurality of mobile transceivers (200) using the beam patterns of the set of first beam patterns (16) on the same time (Continued)

and frequency radio resource. An apparatus (20) operable in a mobile transceiver (200) of a mobile communication system comprises a transceiver module (22), which is operable to receive radio signals using combinations of time and frequency radio resources. The mobile transceiver apparatus (20) comprises a control module (24) operable to control the transceiver module (22). The control module (24) is operable to receive a common control signal from a base station transceiver (100) using different time and frequency resources, to determine a time and frequency resource, which provides the common control signal with a highest quality, and to determine information related to at least one beam pattern used on the time and frequency resource providing the common control signal with the highest quality. The control module (24) is operable to transmit a signal comprising the information related to the at least one beam pattern to the base station transceiver (100).

17 Claims, 3 Drawing Sheets

(51) Int. Cl.
*H04B 7/08* (2006.01)
*H04W 72/08* (2009.01)

(56) References Cited

U.S. PATENT DOCUMENTS

2008/0291884 A1\* 11/2008 Lee .................. H04L 5/0007
370/338
2013/0028696 A1 1/2013 Peschel et al.

\* cited by examiner

APPARATUSES, METHODS AND COMPUTER PROGRAMS FOR A BASE STATION TRANSCEIVER AND A MOBILE TRANSCEIVER

TECHNICAL FIELD

Embodiments relate to apparatuses, methods and computer programs for a base station transceiver and a mobile transceiver, more particularly but not exclusively, to efficient beamforming in mobile communication systems.

BACKGROUND

This section introduces aspects that may be helpful in facilitating a better understanding of the invention(s). Accordingly, the statements of this section are to be read in this light and are not to be understood as admissions about what is in the prior art or what is not in the prior art.

With the increasing demand for data services, wireless systems tend to use more and more bandwidth and higher carrier frequencies. For example, Fifth Generation (5G) wireless access may be expected to embrace "millimeter-waves" (mm-Waves) frequencies to provide multi-Gbps data rates, typically in femto, pico, or metro cell type of deployments. Free space propagation or path loss increases at higher frequencies and may be compensated by exploiting antenna directivity. This may be achieved using high gain adaptive BeamForming (BF) solutions. Adaptive beam-steering may be implemented by analog phase shifters, fully digitally, e.g. by equipping each antenna with a fully digital transmit/receive path, or as hybrid digital/analog solutions, e.g. by connecting each digital transmit/receive path to a set of antennas via analog phase shifters. Base station antenna arrays may include, e.g. 8, 16, 32, 64 or more antenna elements, e.g. tiny horn antenna elements.

Communication in higher frequency ranges than used by today's classical wireless systems, like 11-300 GHz with so-called mm-Waves, faces the challenge of detrimental propagation characteristics. The free-space path loss attenuation increases with the squared carrier frequency and additional sources of attenuation, which can be neglected at classical cellular communication, may appear, such as, for example, due to foliage, water vapor, molecular absorption, rain etc.

Millimeter wave bands may offer plenty of currently unused spectra and thus it is very likely that they will be used for future communication systems.

One benefit of using higher frequencies may be that antenna dimensions shrink and so for a given total antenna size, more antenna elements may be available. Those elements may aim for at least partly compensating the unfavorable attenuation conditions mentioned above when using BF at both ends of the link.

Document US 2004/0214606 A1 relates to a method and a communication system wherein stations communicate on a wireless interface. The method includes the steps of including beam identity information into signals transmitted on multiple beams provided by a first station, receiving at a second station signals transmitted from the first station, and identifying beams via which the second station received signals from the first station based on said identity information. At least one beam for transmission on the wireless interface between the stations is then selected. A station configured for the communication comprises antenna means for receiving signals transmitted from the other station on multiple beams and a controller for identifying beams based on beam identity information associated with signals received from the other station.

SUMMARY OF ILLUSTRATIVE EMBODIMENTS

Some simplifications may be made in the following summary, which is intended to highlight and introduce some aspects of the various exemplary embodiments, but such simplifications are not intended to limit the scope of the inventions. Detailed descriptions of a preferred exemplary embodiment adequate to allow those of ordinary skill in the art to make and use the inventive concepts will follow in later sections.

Various embodiments provide an apparatus, a method and a computer program for a base station transceiver and an apparatus, a method and a computer program for a mobile transceiver. Embodiments may provide an efficient concept for acquisition of a mobile transceiver by a base station transceiver using beamforming gain for common control signals, which may be transmitted even before acquisition. Hence, embodiments may enable or establish higher or even full beamforming gain from the beginning of connection. Embodiments may therefore reduce impairments due to poor propagation conditions in high frequency communications, such as using mm-Waves. Embodiments may enable more efficient communication in a communication system.

Embodiments provide an apparatus, which is operable in a base station transceiver of a mobile communication system. The apparatus comprises a transceiver module, which comprises interfaces to a plurality of antennas. The transceiver module is operable to transmit radio signals using combinations of time and frequency radio resources. The transceiver module is further operable to form a first set of beam patterns using the plurality of antennas. The first set of beam patterns comprises two or more spatially differing beam patterns. The apparatus further comprises a control module, which is operable to control the transceiver module. The control module is further operable to transmit a common control signal for a plurality of mobile transceivers using the beam patterns of the set of first beam patterns on the same time and frequency radio resource. Embodiments may enable efficient use of radio resources by using the same radio resource for a set of two or more beams.

In some embodiments the control module may be operable provide different identifications for the beam patterns of the first set of beam patterns. Embodiments may enable mobile transceivers to identify beam patterns used on the same time and frequency radio resource. The control module may be operable to encode the beam patterns of the first set of beam patterns using orthogonal code sequences. Embodiments may provide efficient beam patterns encoding using code sequences known to a mobile transceiver. The control module may be operable to transmit a plurality of copies of the common control signal on different frequency resources using the beam patterns of the set of first beam patterns. Embodiments may enable a mobile transceiver to average signals received from a beam pattern over a bandwidth or to evaluate beam patterns in a frequency selective manner. In some embodiments the common control signal may correspond to a synchronization signal or a reference signal.

Additionally or alternatively, the transceiver module may be operable to form a plurality of sets of beam patterns. Each set of the plurality of sets of beam patterns may comprise two or more spatially differing beam patterns. The control module may be operable to transmit the common control signal using the plurality of sets of beam patterns. The control module may be further operable to transmit the common control signal on the plurality of sets of beam patterns and using the same time and frequency radio resource within a set of beam patterns. Embodiments may enable provision of a common control signal in a broadcast manner using multiple radio resources and using spatial differentiation of the common control signal per radio resource. In embodiments the main directions of the beam patterns of the plurality of sets of beam patterns may be different, such that overlapping of the beam patterns of the plurality of sets of beam patterns may provide coverage of a cell.

In some embodiments the control module may be operable to receive a response signal from a mobile transceiver. The response signal may comprise information related to at least a beam with a strongest reception quality received at the mobile receiver from the first set of beam patterns. Embodiments may enable a base station transceiver to identify at least a strongest beam for transmission to a mobile transceiver. The control module may be operable to transmit a subsequent radio signal to the mobile transceiver using at least the beam with the strongest reception quality from the first set of beam patterns. Embodiments may enable full beamforming gain at a base station transceiver after having received a signal from a mobile transceiver. The response signal may correspond to a random access preamble transmitted by the mobile transceiver. Embodiments may enable full beamforming gain at a base station transceiver after having received a random access preamble from a mobile transceiver.

The response signal may comprise information related to two or more beams with a strongest reception quality received at the mobile receiver from the first set of beam patterns. The control module of the base station transceiver apparatus may be operable to transmit a subsequent radio signal to the mobile transceiver using at least the two or more beams with the strongest reception quality from the first set of beam patterns. Embodiments may enable spatial diversity or spatial multiplex transmission using multiple beam patterns on the same radio resource.

Embodiments further provide an apparatus, which is operable in a mobile transceiver of a mobile communication system. The apparatus comprises a transceiver module, which is operable to receive radio signals using combinations of time and frequency radio resources. The apparatus further comprises a control module, which is operable to control the transceiver module. The control module is further operable to receive a common control signal from a base station transceiver using different time and frequency resources, and to determine a time and frequency resource, which provides the common control signal with a highest quality. The control module is further operable to determine information related to at least one beam pattern used on the time and frequency resource providing the common control signal with the highest quality. The control module is further operable to transmit a signal comprising information related to the at least one beam pattern to the base station transceiver. Embodiments may enable efficient beam pattern identification at a mobile transceiver.

In some embodiments the control module may be operable to determine information related to two or more beam pattern used on the time and frequency resource providing the common control signal with the highest quality. The control module may be further operable to transmit a signal comprising the information related to the two or more beam pattern to the base station transceiver. Embodiments may enable spatial diversity or spatial multiplex transmission using multiple beam patterns on the same radio resource.

In further embodiments, the transceiver module may comprise interfaces to a plurality of antennas. The control module may be operable to generate different beam patterns using the transceiver module and the interfaces to the plurality of antennas. The control module may be further operable to select one of the different beam patterns to receive the common control signal on the time and frequency resource. Embodiments may enable efficient beamforming on the mobile transceiver side. Furthermore, the control module may be operable to monitor a reception quality of the common control signal from the base station transceiver and to inform the base station transceiver if the beam pattern providing the highest reception quality of the common control signal has changed. Embodiments may enable increased beamforming gain during data transmission by monitoring reception qualities of a common control signal on different beam patterns.

Embodiments further provide a method for a base station transceiver of a mobile communication system. The method comprises transmitting radio signals using combinations of time and frequency radio resources, and forming a first set of beam patterns using the plurality of antennas. The first set of beam patterns comprises two or more spatially differing beam patterns. The method further comprises transmitting a common control signal for a plurality of mobile transceivers using the beam patterns of the set of first beam patterns on the same time and frequency radio resource.

Embodiments further provide a method for a mobile transceiver of a mobile communication system. The method comprises receiving radio signals using combinations of time and frequency radio resources, and receiving a common control signal from a base station transceiver using different time and frequency resources. The method further comprises determining a time and frequency resource, which provides the common control signal with a highest quality. The method further comprises determining information related to at least one beam pattern used on the time and frequency resource providing the common control signal with the highest quality. The method further comprises transmitting a signal comprising the information related to the beam pattern to the base station transceiver.

Embodiments further provide a computer program having a program code for performing one or more of the above described methods, when the computer program is executed on a computer, processor, or programmable hardware component. A further embodiment is a computer readable storage medium storing instructions which, when executed by a computer, processor, or programmable hardware component, cause the computer to implement one of the methods described herein.

BRIEF DESCRIPTION OF THE FIGURES

Some other features or aspects will be described using the following non-limiting embodiments of apparatuses or methods or computer programs or computer program products by way of example only, and with reference to the accompanying figures, in which.

DESCRIPTION OF EMBODIMENTS

Various example embodiments will now be described more fully with reference to the accompanying drawings in which some example embodiments are illustrated. In the figures, the thicknesses of lines, layers or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
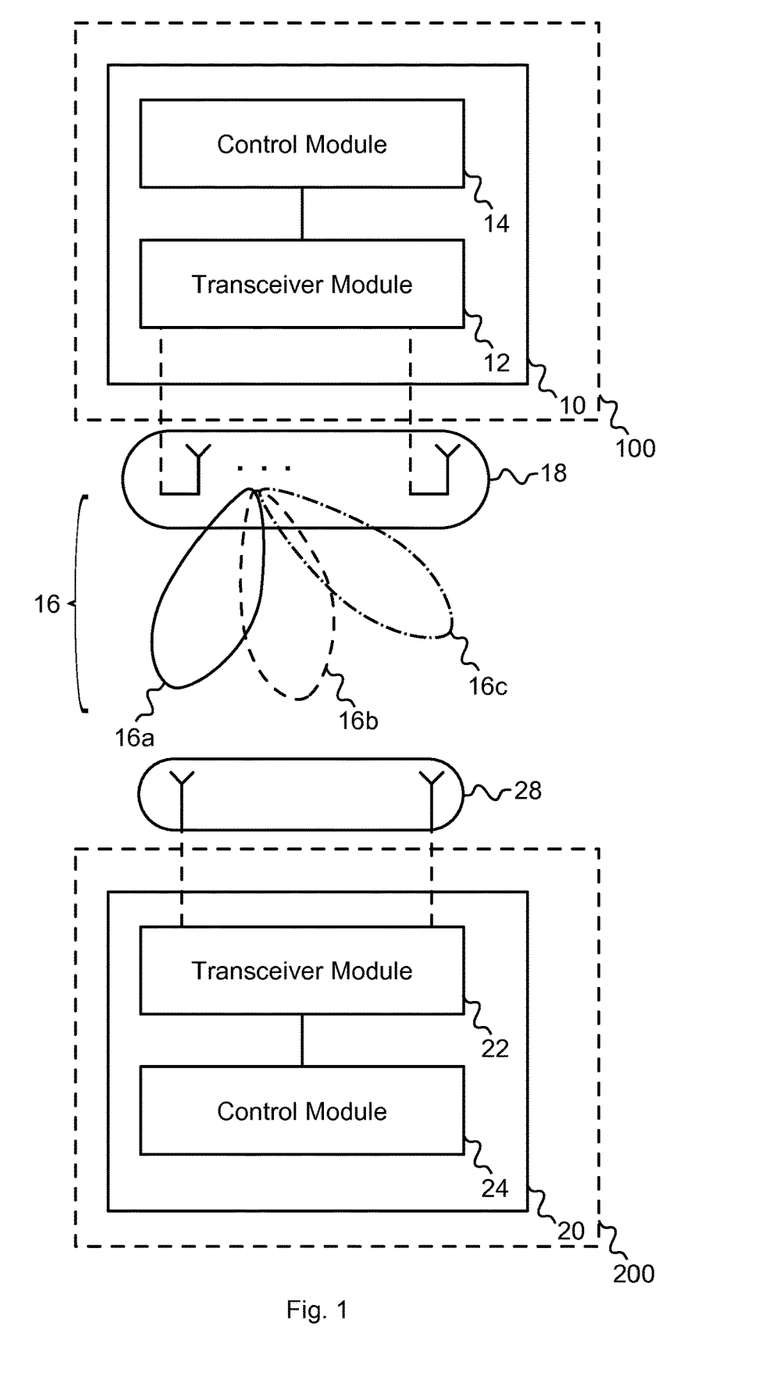
FIG. 1 illustrates a block diagram of an embodiment of an apparatus for a base station transceiver and a block diagram of an embodiment of an apparatus for a mobile transceiver.

In the following some embodiments of apparatuses, methods and computer programs for base station transceivers and mobile transceivers will be described. FIG. 1 illustrates a block diagram of an embodiment of an apparatus 10 for a base station transceiver 100. In other words, the apparatus 10 may be adapted to or operable in a base station transceiver 100; the apparatus 10 may be operated or comprised in a base station transceiver 100. Embodiments may also provide a base station transceiver 100 comprising the apparatus 10. FIG. 1 further shows an embodiment (dashed lines) of a base station transceiver 100 comprising the apparatus 10. The base station transceiver 100 can be operative in a mobile communication system. In other words, the base station transceiver 100, its apparatus 10, respectively, can be adapted, operable, or configured to comply with the mobile communication system.

The mobile communication system may, for example, correspond to one of the Third Generation Partnership Project (3GPP)-standardized mobile communication networks, where the term mobile communication system is used synonymously to mobile communication network. The mobile or wireless communication system may correspond to, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Interoperability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

A base station transceiver can be operable to communicate with one or more active mobile transceivers and a base station transceiver can be located in or adjacent to a coverage area of another base station transceiver, e.g. a macro cell base station transceiver or small cell base station transceiver. Hence, embodiments may provide a mobile communication system comprising one or more mobile transceivers and one or more base station transceivers, wherein the base station transceivers may establish macro cells or small cells, as e.g. pico-, metro-, or femto cells. A mobile transceiver may correspond to a smartphone, a cell phone, user equipment, a laptop, a notebook, a personal computer, a Personal Digital Assistant (PDA), a Universal Serial Bus (USB)-stick, a car, etc. A mobile transceiver may also be referred to as User Equipment (UE) or mobile in line with the 3GPP terminology.

A base station transceiver can be located in the fixed or stationary part of the network or system. A base station transceiver may correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a transmission point etc., which may be further subdivided in a remote unit and a central unit.

A mobile transceiver can be associated, camped on, or registered with a base station transceiver or cell. The term cell refers to a coverage area of radio services provided by a base station transceiver, e.g. a NodeB (NB), an eNodeB (eNB), a remote radio head, a transmission point, etc. A base station transceiver may operate one or more cells on one or more frequency layers, in some embodiments a cell may correspond to a sector. For example, sectors can be achieved using sector antennas, which provide a characteristic for covering an angular section around a remote unit or base station transceiver. In some embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

In other words, in embodiments the mobile communication system may correspond to a HetNet, which utilizes different cell types, i.e. Closed Subscriber Group (CSG) cells and open cells, and cells of different sizes, as, for example, macro cells and small cells, where the coverage area of a small cell is smaller than the coverage area of a macro cell. A small cell may correspond to a metro cell, a micro cell, a pico cell, a femto cell, etc. Such cells are established by base station transceivers for which their coverage areas are determined by their transmission power and interference condition. In some embodiments a small cell's coverage area can at least partly be surrounded by the coverage area of a macro cell established by another base station transceiver. The small cells can be deployed to extend the capacity of the network. A metro cell may therefore be used to cover a smaller area than a macro cell, e.g. a metro cell may cover a street or a section in a metropolitan area. For a macro cell the coverage area may have a diameter in the order of one or more kilometers, for a micro cell the coverage area may have a diameter below a kilometer, and for a pico cell the coverage area may have a diameter below a 100 m. A femto cell may be the smallest cell and it may be used to cover a household or gate section at the airport, i.e. its coverage area may have a diameter below 50 m. Thus, a base station transceiver may also be referred to as cell.

As shown in FIG. 1, the base station transceiver apparatus 10 comprises a transceiver module 12, which further comprises interfaces to a plurality of antennas 18. The plurality of antennas 18 may correspond to transmit and/or receive antennas. The plurality of antennas 18 is indicated in FIG. 1 by an array 18 of transmit/receive antennas connected to interfaces of the transceiver module 12. The transceiver module 12 may correspond to one or more transceiver devices, one or more transceiver units, any means for transceiving, i.e. receiving and/or transmitting etc., and it may comprise typical receiver and transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, etc.

In the embodiment depicted in FIG. 1 the transceiver module 12 is operable to transmit radio signals using combinations of time and frequency radio resources. Time radio resources may correspond to one or more radio frames, sub-frames, slots, symbols, etc. Frequency radio resources may correspond to one or more carriers, sub-carries, bands, sub-bands, frequency channels or sub-channels, etc. The transceiver module 12 is further operable to form a first set of beam patterns 16 using the plurality of antennas. The first set of beam patterns 16 comprises two or more spatially differing beam patterns, for which examples are illustrated in FIG. 1 by means of the beam patterns 16a (solid line), 16b (dashed line), and 16c (dashed-dotted line). The first set of beam patterns may comprise two or more beam patterns, for example, there may be 2, 3, 4, 8, 16, 32, 64, 128 or even more beam patterns in the first set of beam patterns. The base station transceiver apparatus further comprises a control module 14, which is coupled to the transceiver module 12. The control module 14 is operable to control the transceiver module 12. The control module 14 is further operable to transmit a common control signal for a plurality of mobile transceivers 200 using the beam patterns of the set of first beam patterns 16 on the same time and frequency radio resource. The control module 14 uses the transceiver module 12 for transmitting/receiving signals.

In embodiments the control module 14 may be implemented using one or more control units, control devices, any means for controlling, such as a processor, a computer or a programmable hardware component being operable with accordingly adapted software. In other words, the above described functions of the control module 14, may as well be implemented in software, which is then executed on one or more programmable hardware components. Such hardware components may comprise a general purpose processor, a Digital Signal Processor (DSP), a micro-controller, etc. The interfaces of the transceiver module 12, which are used to connect to the plurality 18 of transmit/receive antennas may correspond to any suitable interfaces, for example, a high frequency interface, using coaxial wires, in other embodiments at least some of the plurality 18 of antennas may be located at remote locations, such that the interfaces may correspond to optical interfaces to remotely located antennas, which would still allow the above described BF. The common control signal may correspond to a signal, which addresses multiple mobile transceivers, e.g. based on which synchronization with a base station transceiver can be achieved, based on which access parameters or settings can be determined, etc.

FIG. 1 illustrates an embodiment of an apparatus 20 operable in a mobile transceiver 200 of a mobile communication system. In other words, the apparatus 20 may be adapted to or operable in a mobile transceiver 200; and may be operated or comprised in a mobile transceiver 200. Embodiments also provide a mobile transceiver 200 comprising the apparatus 20. FIG. 1 further shows an embodiment (dashed lines) of a mobile transceiver 200 comprising the apparatus 20. The apparatus 20 comprises a transceiver module 22. The transceiver module 22 may correspond to a similar transceiver module 12 as described above, however, adapted to a mobile transceiver 200, comprising the above described typical transceiver components. In a similar manner, the transceiver module 22 may be implemented as one or more transceiver devices, one or more transceiver units, any means for transceiving, i.e. receiving and/or transmitting etc. The transceiver module 22 is operable to receive radio signals using combinations of time and frequency radio resources. The time and frequency radio resources may correspond to the above described resources.

The transceiver module 22 is coupled to a control module 24. The control module 24 is operable to control the transceiver module 22 and to receive the common control signal from the base station transceiver 100 using different time and frequency resources and the transceiver module 22. The control module 24 is further operable to determine a time and frequency resource, which provides the common control signal with a highest quality. The control module 24 is further operable to determine information related to at least one beam pattern used on the time and frequency resource providing the common control signal with the highest quality. The control module 24 is further operable to transmit a signal comprising the information related to the at least one beam pattern to the base station transceiver 100. In embodiments the control module 24 may be implemented in a similar manner as the above described control module 14 for the base station transceiver 100, the control module 24 may, however, be adapted to the mobile transceiver 200. Embodiments may also provide a system comprising a base station transceiver apparatus 10 and a mobile transceiver apparatus 20 as shown in FIG. 1.

In some embodiments, as also illustrated in FIG. 1, the transceiver module 22 may comprise interfaces to a plurality 28 of antennas. With respect to implementations of the interfaces it is referred to the above described interfaces. The control module 24 may be operable to generate different beam patterns using the transceiver module 22 and the interfaces to the plurality of antennas. The control module 24 may be further operable to select one of the different beam patterns to receive the common control signal on the time and frequency resource.

As has been mentioned above, embodiments, at least of the base station transceiver apparatus 10, make use of BF, which is to be understood as signal processing means to achieve defined or controlled superposition of the signals transmitted by the individual transmit/receive antennas. For example, a geometry of the plurality 18/28 of transmit/receive antennas may correspond to a linear antenna array, a circular antenna array, a triangular antenna array, any two-dimensional antenna array or field, or even an arbitrary antenna array, for as long as geometrical relations between the antenna elements are known or controlled. In some embodiments, the plurality 18/28 of antenna elements or transmit/receive antennas may correspond to a uniform linear antenna array, wherein the transmit/receive antennas are spaced uniformly, and wherein the distance between two antenna elements may correspond to, for example, half of a wavelength of the carrier frequency of the signals transmitted/received using these antennas. As known for BF, by providing phase shifted versions of the same signal to different antennas, constructive and destructive superposition of the transmitted/received signals may be achieved for different angular directions with respect to these antennas. The more antennas are used, the higher the overall BF gain and the narrower a beam that may be formed. In embodiments a transmit/receive antenna or a transmit/receive antenna element may use an individual beam pattern covering a sector or a cell of the base station transceiver 100, e.g. a 90° half power beam width antenna pattern to cover a 120° sector or cell.

In an embodiment, for a uniform linear array with element spacing D, the beamforming weight vector for the M antenna elements, when pointing to direction ϑ (constructive superposition of all signals for direction ϑ) can be expressed as $$w=[\Delta^0, \Delta^1, \ldots, \Delta^{M-1}]^H,$$

with $$\Delta = \exp\left(j2\pi \frac{D}{\lambda} \sin(\vartheta)\right),$$

where λ denotes the carrier wavelength of the respective system. It is to be noted that a narrowband assumption is applied in this example, i.e. it is assumed that the system's bandwidth is small compared to the system's carrier frequency. For example, a mm-Wave system could operate with 64 antenna elements, and an embodiment may use a set of 64 beams, which point into 64 different directions, e.g. each with a half power beam width of roughly 2°.

For example, in a mm-Wave scenario with strong attenuation, weak transmit powers and many antenna elements, embodiments may enable having BF during connection setup and having beamformed reference symbols available, which offer capabilities for measuring the beamformed channel and adapt the transmit beamformer. For example, in an LTE system, the synchronization sequences may be transmitted without beamforming. Also, cell-specific reference symbols (release 8), as well as the Channel State Information (CSI) reference symbols (release 10) may offer no beamforming. The release 10 DeModulation Reference Symbols (DMRS) may have precoding (=beamforming) on top, but they may just be transmitted within physical resource blocks carrying user data. Furthermore, they may just be used for demodulation purposes and provide no possibility to find the best beam for communication. Embodiments may provide multi-beam support in connection setup and operation.

In embodiments, the base station transceiver 100 may transmit beamformed synchronization or also reference symbols. In other words, the common control signal may correspond to a synchronization signal or a reference signal. A set of spatially separable beams (within the first set of beam patterns 16) may be transmitted on the same time frequency resource. In some embodiments the control module 14 is operable provide different identifications for the beam patterns of the first set of beam patterns 16. For example, the control module 14 is operable encode the beam patterns of the first set of beam patterns using orthogonal code sequences. In other words, the beam patterns of the first set 16 may be distinguished by different (e.g. orthogonal or pseudo-random) sequences. The beams within the set 16 may hence have a certain angular separation.

For a particular time-frequency resource in an embodiment, the mobile station 200 may search for the simultaneously offered sequences, e.g. by correlation, also allowing to adjust the considered time-frequency position and its own receive beamformer. It may measure the output power of the sequences (e.g. as an outcome of the correlation). In other words, the control module 24 at the mobile transceiver apparatus 10 may be operable to determine information related to two or more beam patterns 16abc used on the time and frequency resource providing the common control signal with the highest quality. The control module 24 is further operable to transmit a signal comprising the information related to the two or more beam pattern to the base station transceiver 100.

The information related to the quality of the respective beam pattern may correspond to a Signal-to-Noise Ratio (SNR), a Signal-to-Interference Ratio (SIR), a Signal-to-Interference-and-Noise Ratio (SINR), a path loss, a reception power, an attenuation, a Received Signal Code Power (RSCP), a Received Signal Strength Indicator (RSSI), a Doppler shift or spread, etc. In other words, at the mobile transceiver 200 one or more of the above quality measures may be used to determine one or more beam pattern, providing the common control signal with the highest quality.

Accordingly, the control module 14 in an embodiment of the base station transceiver apparatus 10 is operable to receive a response signal from the mobile transceiver 200. The response signal comprises information related to at least a beam with a strongest reception quality received at the mobile receiver from the first set of beam patterns. The control module 14 is operable to transmit a subsequent radio signal to the mobile transceiver 200 using at least the beam with the strongest reception quality from the first set of beam patterns. For example, the response signal corresponds to a random access preamble transmitted by the mobile transceiver 200.

On another time-frequency resource, which may be neighbored or adjacent, e.g. a neighbor sub-band, a different, e.g. angular shifted beam set may be transmitted by the base station transceiver 100. By evaluating all the beam sets across the neighbored resource sets and measuring their quality, e.g. their receive power level, the best beams for communication can be identified. In other words, in some embodiments the transceiver module 12 of the base station transceiver apparatus 10 may be operable to form a plurality of sets of beam patterns. A set, or each of the sets, of the plurality of sets of beam patterns comprises two or more spatially differing beam patterns. The control module 14 may be operable to transmit the common control signal using the plurality of sets of beam patterns. The control module 14 may be further operable to transmit the common control signal on the plurality of sets of beam patterns and using the same time and frequency radio resource within a set of beam patterns. In other words, within one set of beam patterns the same radio resource may be used. Moreover, main directions of the beam patterns of the plurality of sets of beam patterns may be different, for example, they may be substantially orthogonal in that a main direction of any beam pattern from a set may coincide with a substantially zero antenna gain for that direction of any other beam pattern from the set.

For example, for random access, the mobile station 200 uplink beamformer may target at the direction of the dominant incoming path. A random access sequence may carry a few bits-message, indicating the beam index of the strongest observed downlink beam. In other words, the signal transmitted by the mobile transceiver apparatus 20 may correspond to a random access preamble. After reception of the radom access preamble the base station transceiver 100 may establish a link to the mobile transceiver 200 using the indicated strongest beam. It is to be noted that a Time Division Duplex (TDD) system may offer channel reciprocity (uplink and downlink radio channels for a given radio resource are assumed substantially equal). In a Frequency Division Duplexing (FDD) system with not too large duplexing distance (in terms of frequency separation of uplink and downlink), the dominant reflectors are assumed to be the same for both uplink and downlink, and hence at least macro paths may be assumed to be substantially equal in uplink and downlink. For a random access, the mobile transceiver apparatus 20 may use BF to point a beam pattern at the direction of the dominant incoming path. In an embodiment, a random access sequence may carry one or more bits or binary information indicating a beam index of the strongest observed downlink beam. Now the base station transceiver 100 can establish a link to this mobile transceiver 200 using the indicated strongest beam.

After this connection setup, the system may operate with BF for the data transmission. The mobile station transceiver 200 may continuously evaluate the multi-beam synchronization (and/or reference) symbols in order to verify whether the current beam selection is still optimal or at least a good solution. In case the situation has changed, the mobile transceiver 200 may transmit feedback information, indexing the new preferred beams for communication. That is to say that the control module 24 of the mobile transceiver apparatus 20 may be operable to monitor a reception quality of the common control signal from the base station transceiver 100 and the control module 24 may be operable to inform the base station transceiver 100 when/if the beam pattern providing the highest reception quality of the common control signal has changed. Optionally, the feedback may be provided on regular time intervals.

In the following the connection setup procedure is described in an embodiment. During the connection setup procedure synchronization and best beam identification are carried out. In an embodiment, the base station transceiver apparatus 10 transmits beamformed synchronization sequences using the first set of beam patterns 16. The first set of beam patterns 16 corresponds to a set of spatially separable beams, and the synchronization sequences are transmitted on the same time-frequency resource using all beams from the first set 16. Each beam gets assigned a different (e.g. orthogonal or pseudo-random) sequence. There may be primary synchronization sequences, for example, with Constant Amplitude, Zero AutoCorrelation CAZAC property, like Zadoff-Chu or Bjorck sequences, and secondary synchronization sequences, for example, Maximum length sequences (M-sequences), used for coarse and fine granular synchronization and identification of particular IDentifications (IDs).

For a particular time frequency resource, the mobile station transceiver apparatus 20 searches for the simultaneously offered sequences, e.g. by correlation, also allowing to adjust the considered time-frequency position and its receive beamformer. It measures the output power of the sequences (e.g. as an outcome of the correlation). By evaluating all the beam sets across the (e.g. neighbored) resource sets and measuring their receive power level, the best beams for communication can be identified. In other words, in order to speed up the search and reduce consumption of valuable time-frequency resources, embodiments may offer multiple beams/beam patterns at the same time-frequency resource. The beam patterns are separated in space and can be identified by the use of different sequences mapped onto those simultaneously used beams.

In embodiments, there may also be beamformed reference symbols used as common control signal in the multi-beam configuration in addition or alternatively to the synchronization channel. Measurements for searching the best beam at the mobile transceiver apparatus 20 may then, additionally or alternatively, be based on the respective reference symbols. For example, reference symbols may be used additionally in case the synchronization sequences are inserted scarcely or are considered to be taking away too many multiple access resources. The feedback/response signal transmitted by the mobile transceiver apparatus 10 may optionally contain multiple beam indices, e.g. the strongest ones, which may be used by the base station transceiver apparatus 20, for example, for spatial multiplexing of different data streams, for diversity or for increasing the options in space in case of transmission to multiple users. That is to say that in some embodiments the response signal comprises information related to two or more beams with a strongest reception quality received at the mobile transceiver 200 from the first set of beam patterns. The control module 14 may then be operable to transmit a subsequent radio signal to the mobile transceiver 200 using at least the two or more beams with the strongest reception quality from the first set of beam patterns 16.

For the above embodiment using 64 antenna elements, the beam indices may be ordered in the different directions, e.g. of a 120° sector. For example a first beam set 16 may be formed out of e.g. 4 beams by beam indices {1, 17, 33, 49}.

Another beam set may use indices {2, 18, 34, 50} etc. The beams within one set are well separated in space in conjunction with the expected angular spread of the propagation channel. In the embodiment there may be 16 different beam sets, which can be mapped to 16 (e.g. neighbored) time-frequency resources, e.g. 16 different sub-bands. In case of large system bandwidth, those different beam assignments may be repeated multiple times over the whole frequency band. That is to say that in some embodiments the control module 14 of the base station transceiver apparatus 10 is operable to transmit a plurality of copies of the common control signal on different frequency resources using the beam patterns of the set of first beam patterns 16. This may allow averaging over the bandwidth for multiple or even all the sub-bands with the same beam set, or, to evaluate the choice of the best beams in a frequency-selective manner.

For example, a split into 4 beams in one set of beam patterns on which the control signal is simultaneously transmitted may result into a power loss of 6 dB (total transmit power equally shared between the four beam patterns), but BF across 64 elements provides a BF gain of 18 dB in a main direction of the respective beam or beam pattern. So per beam a total transmit BF gain of 12 dB may be provided, which may be further enhanced or increased by receive BF gains, and the single antenna element gains at both ends of the link. For the above given embodiment, 64 beams with a beam set size of 4, the coverage range of a cell enabling access may be increased by 12 dB in terms of link budget, compared to a non-beamformed transmission of synchronization sequences, like in LTE systems.

In embodiments, the size of the beam set (number of beam patterns in one set) may allow to trade off power gain and resource consumption. If, for example, power gain is the most important, a set may be reduced to two or even a single beam. If resource consumption is the most important, the beam set could e.g. be as large as 16 beams at the same time.

Embodiments may offer a connection setup and operation for mm-Waves, which may be supported from scratch in the system. The multi-beam aspect of embodiments may allow trading off beamforming gains and resource consumption.

Figure 2:
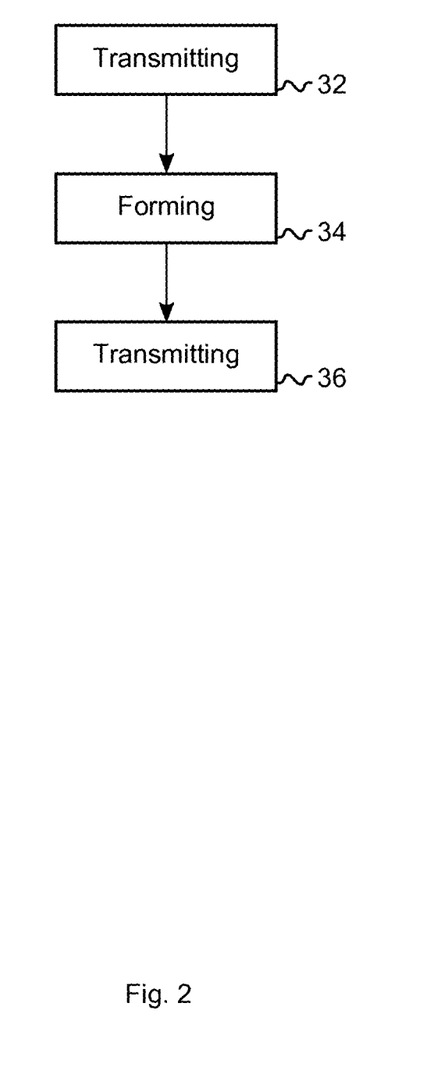
FIG. 2 illustrates a block diagram of a flow chart of an embodiment of a method for a base station transceiver.

FIG. 2 illustrates a block diagram of a flow chart of an embodiment of a method for a base station transceiver 100. The method comprises transmitting 32 radio signals using combinations of time and frequency radio resources. The method further comprises forming 34 a first set of beam patterns 16 using the plurality of antennas. The first set of beam patterns comprises two or more spatially differing beam patterns. The method further comprises transmitting 36 a common control signal for a plurality of mobile transceivers 200 using the beam patterns of the set of first beam patterns 16 on the same time and frequency radio resource.

Figure 3:
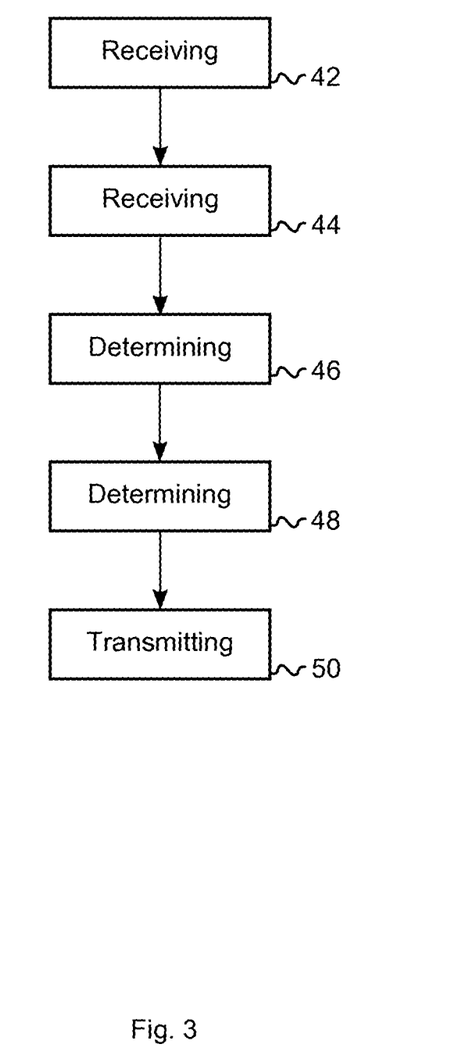
FIG. 3 illustrates a block diagram of a flow chart of an embodiment of a method for a mobile transceiver.

FIG. 3 illustrates a block diagram of a flow chart of an embodiment of a method for a mobile transceiver 200 of a mobile communication system. The method comprises receiving 42 radio signals using combinations of time and frequency radio resources and receiving 44 a common control signal from a base station transceiver 100 using different time and frequency resources. The method further comprises determining 46 a time and frequency resource, which provides the common control signal with a highest quality. The method further comprises determining 48 information related to at least one beam pattern used on the time and frequency resource providing the common control signal with the highest quality. The method further comprises transmitting 50 a signal comprising the information related to the beam pattern to the base station transceiver 100.

A further embodiment is a computer readable storage medium storing instructions which, when executed by a computer, cause the computer to implement one of the methods described herein. Other embodiments are a computer program or a computer program product having a program code for performing anyone of the above described methods, when the computer program or computer program product is executed on a processor, computer, or programmable hardware.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", "means for transceiving", "means for controlling", etc., may be provided through the use of dedicated hardware, such as "a transceiver", "a controller/processor", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

The invention claimed is:

1. An apparatus operable in a base station transceiver of a mobile communication system, the apparatus comprising:
a transceiver module comprising a processor and interfaces to a plurality of antennas and configured to:
transmit radio signals using combinations of time and frequency radio resources,
form a first set of beam patterns for improved power gain using the plurality of antennas, the first set of beam patterns comprising two or more spatially differing beam patterns, and
form a second set of beam patterns for improved resource consumption using the plurality of antennas, the second set of beam patterns comprising a number of beam patterns which is greater than a number of beam patterns of the first set; and
a control module comprising a processor and configured to:
control the transceiver module,
transmit, on the same time and frequency radio resource, a common control signal for a plurality of mobile transceivers using the:
first set of beam patterns for the improved power gain, or
second set of beam patterns for the improved resource consumption; and
distinguish the beam patterns that are transmitted on the same time and frequency radio resource with either an orthogonal sequence or a pseudo-random sequence;
wherein the common control signal corresponds to a synchronization signal.

2. The apparatus of claim 1, wherein the control module is configured to distinguish the beam patterns of the first set of beam patterns using orthogonal code sequences.

3. The apparatus of claim 1, wherein the control module is configured to transmit a plurality of copies of the common control signal on different frequency resources using the beam patterns of the set of first beam patterns, and/or wherein the common control signal corresponds to a reference signal.

4. The apparatus of claim 1, wherein the transceiver module is configured to form a plurality of sets of beam patterns, a set of the plurality of sets of beam patterns comprising two or more spatially differing beam patterns, and wherein the control module is configured to transmit the common control signal using the plurality of sets of beam patterns, wherein the control module is further configured to transmit the common control signal on the plurality of sets of beam patterns and using the same time and frequency radio resource within a set of beam patterns.

5. The apparatus of claim 4, wherein main directions of the beam patterns of the plurality of sets of beam patterns are different.

6. The apparatus of claim 1, wherein the control module is configured to receive a response signal from a mobile transceiver, the response signal comprising information related to at least a beam with a strongest reception quality received at the mobile transceiver from the first set of beam patterns.

7. The apparatus of claim 6, wherein the control module is configured to transmit a subsequent radio signal to the mobile transceiver using at least the beam with the strongest reception quality from the first set of beam patterns.

8. The apparatus of claim 6, wherein the response signal comprises information related to two or more beams with a strongest reception quality received at the mobile transceiver from the first set of beam patterns, and wherein the control module is configured to transmit a subsequent radio signal to the mobile transceiver using at least the two or more beams with the strongest reception quality from the first set of beam patterns.

9. An apparatus operable in a mobile transceiver of a mobile communication system, the apparatus comprising:
a transceiver module comprising a processor and configured to:
receive radio signals using combinations of time and frequency radio resources; and
a control module comprising a processor and configured to:
control the transceiver module;
wherein the control module is further configured to:
receive a first set of beam patterns for improved power gain that are transmitted on the same time and frequency resource, the first set of beam patterns distinguished with either an orthogonal sequence or a pseudo-random sequence, or
receive a second set of beam patterns for improved resource consumption using the plurality of antennas, the second set of beam patterns comprising a number of beam patterns which is greater than a number of beam patterns of the first set;
wherein the control module is further configured to:
receive a common control signal from a base station transceiver using different time and frequency resources, determine a time and frequency resource, which provides the common control signal with a highest quality, determine information related to at least one beam pattern used on the time and frequency resource providing the common control signal with the highest quality, and transmit a signal comprising the information related to the at least one beam pattern to the base station transceiver, wherein the common control signal corresponds to a synchronization signal.

10. The apparatus of claim 9, wherein the control module is configured to determine information related to two or more beam patterns used on the time and frequency resource providing the common control signal with the highest quality, and to transmit a signal comprising the information related to the two or more beam pattern to the base station transceiver.

11. The apparatus of claim 9, wherein the transceiver module comprises interfaces to a plurality of antennas, and wherein the control module is configured to generate different beam patterns using the transceiver module and the interfaces to the plurality of antennas, wherein the control module is further configured to select one of the different beam patterns to receive the common control signal on the time and frequency resource.

12. The apparatus of claim 9, wherein the control module is configured to monitor a reception quality of the common control signal from the base station transceiver, and the control module is configured to inform the base station transceiver when the beam pattern providing the highest reception quality of the common control signal has changed.

13. A method for a base station transceiver of a mobile communication system, the method comprising:

transmitting radio signals using combinations of time and frequency radio resources;

forming a first set of beam patterns for improved power gain using the plurality of antennas, the first set of beam patterns comprising two or more spatially differing beam patterns;

forming a second set of beam patterns for improved resource consumption using the plurality of antennas, the second set of beam patterns comprising a number of beam patterns which is greater than a number of beam patterns of the first set; and transmitting, on the same time and frequency radio resource, a common control signal for a plurality of mobile transceivers using the:

first set of beam patterns for the improved power gain, or second set of beam patterns for the improved resource consumption;

wherein the beam patterns that are transmitted on the same time and frequency radio resource are distinguished with either an orthogonal sequence or a pseudo-random sequence, and wherein the common control signal corresponds to a synchronization signal.

14. A method for a mobile transceiver of a mobile communication system, the method comprising:

receiving a first set of beam patterns for improved power gain that are transmitted on the same time and frequency resource, the first set of beam patterns distinguished with either an orthogonal sequence or a pseudo-random sequence, or receiving a second set of beam patterns for improved resource consumption using the plurality of antennas, the second set of beam patterns comprising a number of beam patterns which is greater than a number of beam patterns of the first set;

wherein the method further comprises:

receiving radio signals using combinations of time and frequency radio resources;

receiving a common control signal from a base station transceiver using different time and frequency resources;

determining a time and frequency resource, which provides the common control signal with a highest quality;

determining information related to at least one beam pattern used on the time and frequency resource providing the common control signal with the highest quality; and transmitting a signal comprising the information related to the beam pattern to the base station transceiver, wherein the common control signal corresponds to a synchronization signal.

15. A computer program product, comprising a non-transitory computer usable medium having computer readable program code embodied therein, the computer readable program code configured to be executed to implement the method of claim 13.

16. A computer program product, comprising a non-transitory computer usable medium having computer readable program code embodied therein, the computer readable program code configured to be executed to implement the method of claim 14.

17. The apparatus of claim 6, wherein the response signal corresponds to a random access preamble transmitted by the mobile transceiver.

* * * * *